United States Patent
Heyn et al.

[11] Patent Number: 5,494,344
[45] Date of Patent: Feb. 27, 1996

[54] CORNERING IDENTIFICATION METHOD

[75] Inventors: Harald Heyn, Frankfurt am Main; Ralph Gronau, Wetter; Gunther Buschmann, Idstein; Thomas Striegel, Liederbach, all of Germany

[73] Assignee: ITT Automotive Europe GmbH, Germany

[21] Appl. No.: 240,667

[22] PCT Filed: Jul. 29, 1993

[86] PCT No.: PCT/EP93/02023

§ 371 Date: Apr. 29, 1994

§ 102(e) Date: Apr. 29, 1994

[87] PCT Pub. No.: WO94/06657

PCT Pub. Date: Mar. 31, 1994

[30] Foreign Application Priority Data

Sep. 11, 1992 [DE] Germany ............... 42 30 481.4

[51] Int. Cl.$^6$ ................................................ B60T 8/24
[52] U.S. Cl. ......................................... 303/140; 303/147
[58] Field of Search ..................... 180/197; 280/707; 303/24.1, 91, 95–97, 103, 109, 111, 100, 140, 146, 147, 148; 364/426.01–426.03, 424.05

[56] References Cited

U.S. PATENT DOCUMENTS

| | | |
|---|---|---|
| 4,011,563 | 3/1977 | Robbi . |
| 4,794,539 | 12/1988 | Wallentowitz et al. ............ 300/100 X |
| 4,844,556 | 7/1989 | Fennel et al. ............................ 303/100 |
| 4,844,557 | 7/1989 | Giers ....................................... 303/111 |
| 5,001,637 | 3/1991 | Shiraishi et al. ................... 364/424.05 |
| 5,102,202 | 4/1992 | Breen ............................................ 303/7 |
| 5,136,507 | 8/1992 | Shiraishi et al. ................... 364/424.05 |
| 5,225,982 | 7/1993 | Ito et al. ............................... 180/197 X |
| 5,255,192 | 10/1993 | Ito et al. ............................. 364/426.03 |
| 5,258,912 | 11/1993 | Ghoneim et al. .................. 364/424.05 |
| 5,275,474 | 1/1994 | Chin et al. .......................... 303/111 X |
| 5,299,131 | 3/1994 | Haas et al. .......................... 364/426.03 |
| 5,302,010 | 4/1994 | Ehmer et al. ............................ 303/111 |
| 5,329,805 | 7/1994 | Yahagi et al. .................. 364/426.02 X |

FOREIGN PATENT DOCUMENTS

| | | |
|---|---|---|
| 3127302 | 1/1983 | Germany . |
| 3718421 | 12/1988 | Germany . |
| 3719748 | 12/1988 | Germany . |
| 3726998 | 2/1989 | Germany . |
| 3812570 | 10/1989 | Germany . |
| 4019886 | 9/1991 | Germany . |
| 4018495 | 12/1991 | Germany . |

*Primary Examiner*—Robert J. Oberleitner
*Assistant Examiner*—Alfred Muratori
*Attorney, Agent, or Firm*—Ratner & Prestia

[57] ABSTRACT

In a cornering identification method which, in particular, is provided for automotive vehicles with anti-lock control or traction slip control, the rotating velocities of the two wheels of the one (non-driven) axle are measured and a correction value is continuously determined for the difference in the rolling circumferences of the tires of the two wheels. A reference value (THR) is developed which is representative of a straight-line course and, in accordance with a predetermined time pattern, this reference value is continuously corrected in dependence on the velocity difference of the two wheels. For cornering identification, a velocity difference value (DIF) is compared with the reference value (THR). At the beginning, i.e., after the start of cornering identification, the reference value (THR) will be corrected in relatively short periods which will be prolonged as the ride goes on. The rate of change ($\Delta$ THR) of the reference value (THR) is likewise high at the beginning, decreasing thereafter.

38 Claims, 3 Drawing Sheets

1 - MAX.GRADIENT (+1): STEERING INTO BEND
2 - REVERSAL POINT
3 - MAX.GRADIENT (+1/+2): STEERING OUT OF BEND
4 - CHANGE OF SIGN
5 - STEERING INTO BEND OF DIFF. DIRECTION, MAX. GRADIENT
6 - NO CHANGE IN STEERING SITUATION
7 - STEERING OUT OF BEND OF DIFF. DIRECTION, AS 3
8 - STEERING-IN WITHOUT MAX. GRADIENT

CORNERING IDENTIFICATION METHOD

BACKGROUND OF THE INVENTION

The present invention relates to a cornering identification method provided, in particular, for automotive vehicles with anti-lock and/or traction slip control. This method involves (a) continuously detecting a correction value which depends on the difference in the rolling circumferences of the tires, (b) with this correction value being taken into account, detecting the velocity difference of the two wheels, and (c) evaluating the velocity difference for cornering identification.

Cornering identification is useful, for example, for improvement of an anti-lock or traction slip control system. In such control systems, the information required for control is generally derived solely from the rotational behavior of the individual wheels. However, situations arise where the wheel signals are not absolutely clear. There are very similar wheel variations in case of controlled braking operations on μ-split roads (meaning different friction coefficients on the right and left sides) and in case of braking during cornering when the centrifugal force on the wheel load differences on the inside and on the outside of the bend increase. However, while on μ-split roads, the pressure build-up gradient on the side of the higher friction coefficient should be flattened to prevent high yawing· moments. Such a measure, taken during a braking operation in a bend, can cause the vehicle to oversteer and lead to a lengthening of the stopping distance. Consequently, yawing moment management should be switched off or changed during braking operations when cornering.

German Patent Application (DE) No. 37 18 421 A1 discloses a circuit configuration where the velocity difference of the two wheels of one axle is evaluated for cornering identification. Moreover, this circuit configuration has circuits for generating a system-induced error correction signal which is independent of the momentary cornering situation and which essentially is obtained by filtering the scaled velocity difference signal with different time constants; when identifying a cornering situation, the time constant of approximately 30–120 seconds, which is valid for straight-line driving, will be raised to a time constant of approximately 150–300 seconds.

A cornering identification device for a traction control circuitry is described in German Patent Application (DE) No. 31 27 302 C2. Cornering identification is based solely on measuring the speed difference between the two non-driven wheels. In this known circuitry, speed differences due to different rolling circumferences or the like can automatically lead to a faulty shift in the response thresholds.

SUMMARY OF THE INVENTION

It is, thus, an object of the present invention to develop a method by means of which, in evaluating the signals representative of the rotational behavior of the wheels, it will be possible to differentiate between a cornering situation and a situation of straight-line driving reliably and independently of any differences in the rolling circumferences of the tires.

The particular feature of the present inventive method is that: (a) a reference value is developed which is representative of a straight-line course, (b) this reference value is continuously corrected in dependence on the corrected and rated velocity difference between the two wheels of one axle in accordance with a predetermined time pattern or time grid, and (c) for cornering identification, this velocity difference or difference value is compared with the momentary value of the reference value.

Due to the continuous correction, there will be a permanent increase in the correctness or, rather, in the measure of coincidence of this reference value with a value actually characteristic of a straight-line course. This is also true in case of considerable differences in the rolling circumferences of the tires caused, for example, by unilateral wear, by the mounting of an emergency wheel or the like. As travelling time becomes longer, identification of the rolling differences of the tires will become more and more reliable.

According to an advantageous embodiment of the present invention, at the beginning, i.e., after the start of cornering identification which was brought on, for example, by starting the engine of the vehicle, the reference value will be corrected in relatively short steps or periods, respectively, which then will be prolonged continuously or stepwise as the travelling time goes on.

The percentage rates of change of the reference value are variable in accordance with another aspect of the present invention. At the beginning, rates will be relatively high and will, thereupon, be reduced in steps to lower percentages. If, within predetermined periods, the velocity differences are small or no correction of the reference value takes place, there will be an increase, such as a simple doubling or multiple doubling, of the minimum times after the expiration of which correction of the reference value will be possible. Simultaneously, the percentage rate of change can be reduced because, obviously, a stable no-correction-requiring reference value had already been reached.

In a further embodiment of the present invention, the reference value is obtained by means of a counter which, starting from a mean, registers the deviation of the velocity difference from the reference value and, as soon as the deviation reaches a limit value and/or persists beyond a predetermined period, will increase or decrease the reference value by a predetermined percentage value in the direction of a reduction of the deviation. As long as the deviation from the reference value has the same direction, the contents of the counter will be increased or decreased at the rate of the counting cycle. The upper or lower terminal value of the counter being reached, correction of the reference value will take place in such a direction as to approach the velocity difference and the counter will be reset to the starting value (mean). If the difference value and the reference value coincide and if the counter contents deviates from the starting value (mean), the counter contents will be raised or lowered at the rate of the operating cycle in the direction of the starting value. Expediently, the counting cycle will be variable and will be halved several times, starting from a relatively fast cycle at the beginning, which means that counting will be slowed down.

Expediently, evaluation of the inventive cornering identification will not take place before a threshold value of the vehicle velocity, such as a threshold of 30 km/hr, will have been passed.

In another embodiment of the inventive method, one or several additional memories are used which register the change of respectively the velocity difference or of the gradient of the velocity difference and provide fast identification of steering-in and steering-out operations, of quick steering changes, and the like.

There are many ways of evaluating this information so as to improve control and to prevent undesirable monitoring signals.

It will further be expedient to compare the vehicle velocity or vehicle reference velocity with the velocity of the wheels monitored for the purpose of cornering identification and to interrupt cornering identification as soon as the difference between the vehicle (reference) velocity and the slower wheel exceeds a predetermined limit value. In this way, preventive action is taken against false cornering because of partial braking actions. The cornering identification status valid at this time will be maintained for control.

Likewise, upon the onset of anti-lock control or traction slip control, the status of cornering identification detected up to this time will be considered constant until this phase of control will have been completed. In this way, slip occurring during control, which might erroneously be taken for a cornering identification signal, will be excluded.

Additional characteristics, advantages and applications of the present invention will become evident from the following description of further details, reference being made to the drawings.

DETAILED DESCRIPTION OF THE INVENTION

The following explanations, with reference to the drawings, relate to an anti-lock-controlled brake system or, rather, to an anti-lock control system (ABS) for a rear-axle drive automotive vehicle. In this system, the information required for control is obtained by means of wheel sensors.

Cornering identification is used in such a system, for example, to differentiate between μ-split driving situations and cornering. For applying the inventive method, in the present example, the rotational behavior of the non-driven front wheels is evaluated. At first, the difference value is developed which is referred to by DIF in FIG. 1 and which is derived from the velocity difference of the two front wheels. Particularly in the present instance, it is the difference of the K-factors of the two front wheels that is used for developing difference value DIF. These K-factors represent the filtered wheel velocity deviations in terms of percentage. The K-factors are developed by dividing the velocity of the slowest wheel ($v_{min}$) by the velocity of the respective wheel ($v_n$). Thus, $$K_n = \frac{v_{min}}{v_n} ; n = 1, 2, 3, 4$$

$$DIF = |K_1 - K_2|,$$

with the velocities of the front wheels being identified $v_1$, $v_2$.

If only the two front wheels were under consideration, the information on the difference of the rolling circumferences, of course, would already be contained in one percentage K-factor.

Figure 1:
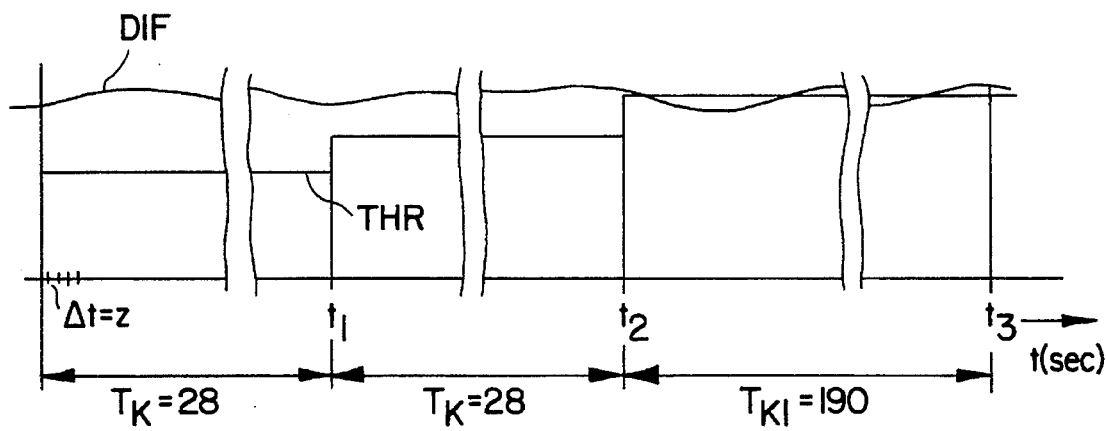
FIGS. 1 through 6 illustrate curves useful in understanding the present invention.

In accordance with the present invention, a reference value THR, shown in FIG. 1 and representative of a straight-line courser is developed and continuously corrected in dependence on the variation of difference value DIF in accordance with a predetermined time grid or time pattern. The deviation of difference value DIF from the continuously corrected reference value THR exclusively serves to identify cornering or, rather, the radius-independent identification of a certain transversal acceleration caused by cornering.

Figure 2:
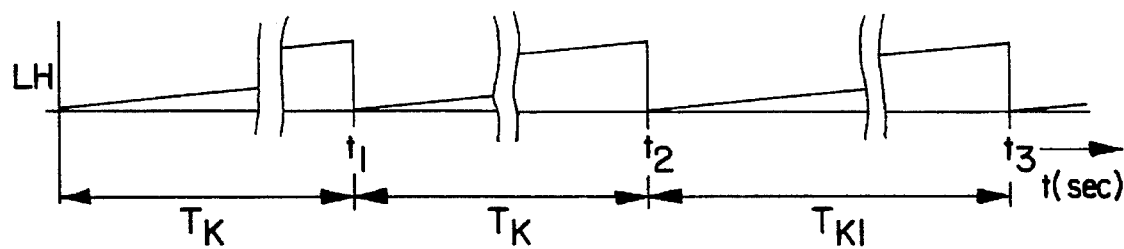

In the present example, the reference value THR, representing a straight-line course, is corrected by means of a counter or register (LN=learn), shown in FIG. 2. The counter will be started as soon as the vehicle velocity or vehicle reference velocity exceeds a predetermined threshold of 30 km/hr. Starting from a mean, the counter will be increased or decreased at the rate of the counting cycle as long as the reference value THR deviates from the difference value DIF. What is registered in each case is only whether or not there is a deviation and whether reference value THR is higher or lower than difference value DIF. The operating cycle of this example is 224 milliseconds at the beginning. If the deviation is positive or negative, the counter will be incremented or decremented respectively until the counter reaches its positive or negative terminal value. In this example, this will occur after 128 steps or 28 seconds at the earliest. When reaching the terminal value at time $t_1$, reference value THR will be corrected by a certain value in the direction of a reduction in the deviation between reference value THR and difference value DIF, the counter LN being reset. The described operation will be repeated. At time $t_2$, reference value THR will be corrected anew and the counter will be reset. As now, i.e., after $t_2$, the deviation of difference value DIF from reference value THR is temporarily negative and temporarily positive, a terminal value of the counter, in conjunction with correction of the reference value THR and resetting of counter LN, will not be reached before 190 seconds.

Figure 3:
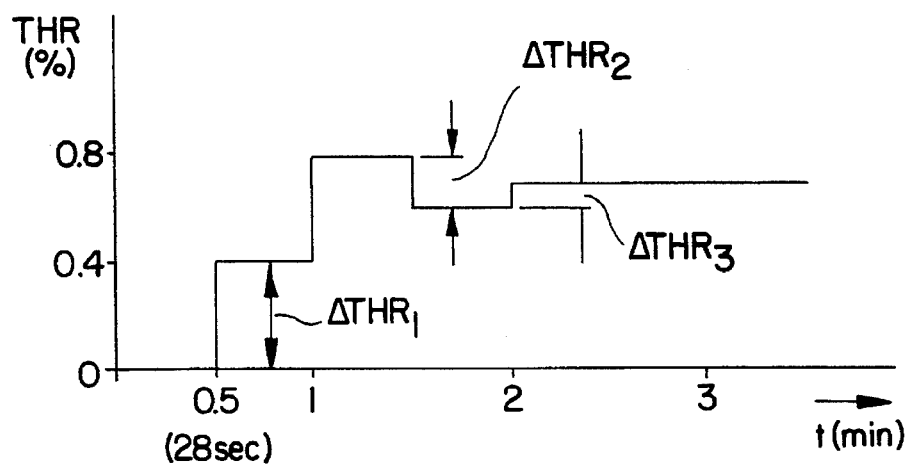

FIG. 3, which has another time measure besides those shown in FIGS. 1 and 2, illustrates that the rate of change is variable by means of which reference value THR will be corrected after reaching a terminal value of counter LN. At the beginning, after starting the vehicle, it is desired that the reference value representing a straight-line course will be learned or, rather, developed as fast as possible. Consequently, the rate of change is high at the beginning. Correction or, rather, any increase or decrease of reference value THR will take place at a rate of change of 0.4% as long as the direction of adaptation remains the same. After reversal of the direction of adaptation, the rate of change will be lowered to 0.2% and, later on, to 0.1%. This lowest value will then be maintained. In the examples of FIG. 3, the rate of change is 0.4% when reaching the terminal value of the counter (counter LN) for the first and second times, i.e. after 28 seconds, and (approximately) 1 minute subsequently after 1.5 minutes, the value becomes 0.2% and thereupon 0.1%.

Figure 4:
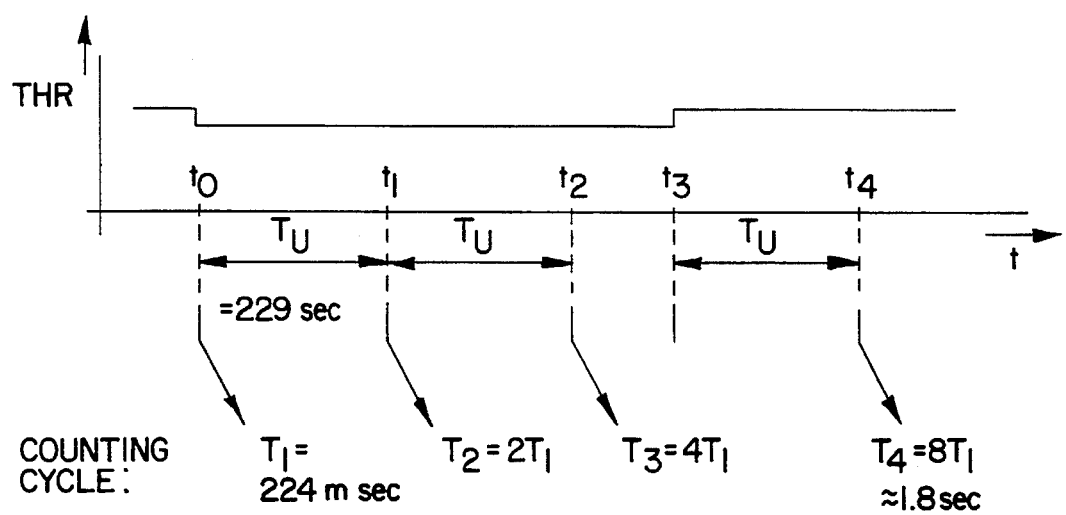

FIG. 4 illustrates the change of the counting rate of the counter LN as the ride continues. At the beginning, after starting the vehicle engine, the counting rate is $T_1$=224 milliseconds. If a high-degree approach of reference value THR to difference value DIF has already been effected, so that no correction of reference value THR is noticeable for a predetermined prolonged period $T_U$, the counting rate of $T_1$=224 milliseconds will be doubled repeatedly in several steps. To this end, a counter is used which determines the expiration of the predetermined period $T_U$ which here is set at 229 seconds. By repeated doubling of the basic period of $T_1$=224 milliseconds, the counting rate will be raised to a maximum of (approximately) $T_4$=1.8 seconds. As shown in FIG. 4, the counter registering the predetermined period $T_U$ of 229 seconds will always be started when a correction of reference value THR will have been effected. Any further increase in the counting rate, in case the 1.8 seconds terminal value will not yet have been reached, will, on principle, be triggered after the expiration of any complete period $T_U$.

The described development of the reference value, therefore, will only come on above a certain speed, such as 30 km/hr, in order to prevent parking maneuvers, long winding drives in parking garages, and the like from causing a shift in the reference value to a value characterized by cornering and not by a straight-line course. This would imply a delay in the "learning process" or, rather, in correcting the reference value THR to the real value. If the driving speed temporarily drops below the 30 km/hr velocity threshold, the "learning" or, rather, the counting process shown in FIG. 2 will temporarily be stopped and continued after the velocity threshold has been exceeded again.

All the afore-described measures, which can be varied by changed time grids, by a finer partition of the time grid, or the like, serve the general object of correcting or adapting the reference value THR, representative of a straight-line course, as fast as possible at the beginning and, thereupon, permitting any changes or corrections only in but small steps and very slowly when the results have become "safer" due to the prolonged straight-line course.

In order to prevent high yawing moments during anti-lock controlled braking operations on μ-split roads, it is necessary to flatten the pressure build-up gradient on those wheels that will be running on the higher friction coefficient. This measure is referred to as "yawing moment management".

Figure 5:
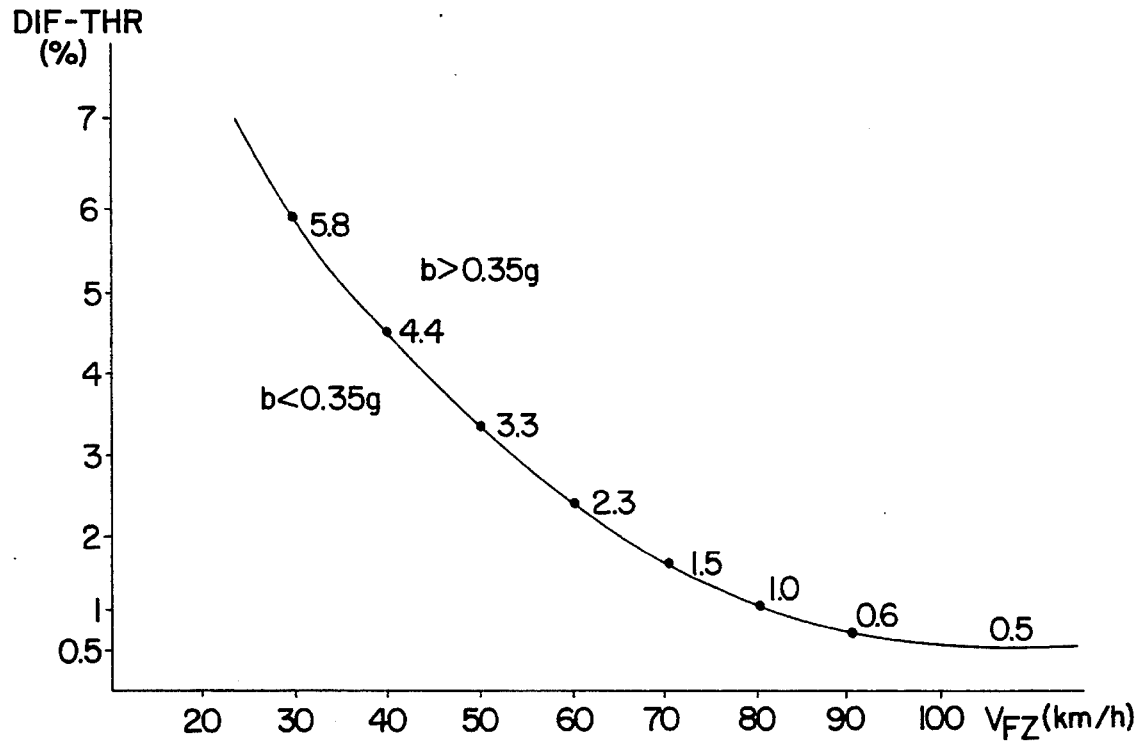

For the actual cornering identification, the percentage velocity difference, defined by the deviation of the difference value DIF from the continuously corrected reference value THR, will be evaluated in dependence on the vehicle velocity. In this way, cornering identification of a constant transversal acceleration will be radius-independent. FIG. 5 represents the correlation with regard to a transversal acceleration of approximately 0.35 g. In the present example, this transversal acceleration is a threshold value for putting yawing moment management out of operation. A situation to the right of the illustrated characteristic line is identified as cornering and leads to switching-off of yawing moment management. If the measured values are to the left of the characteristic line, the driving situation is assumed to be straight on.

Figure 6:
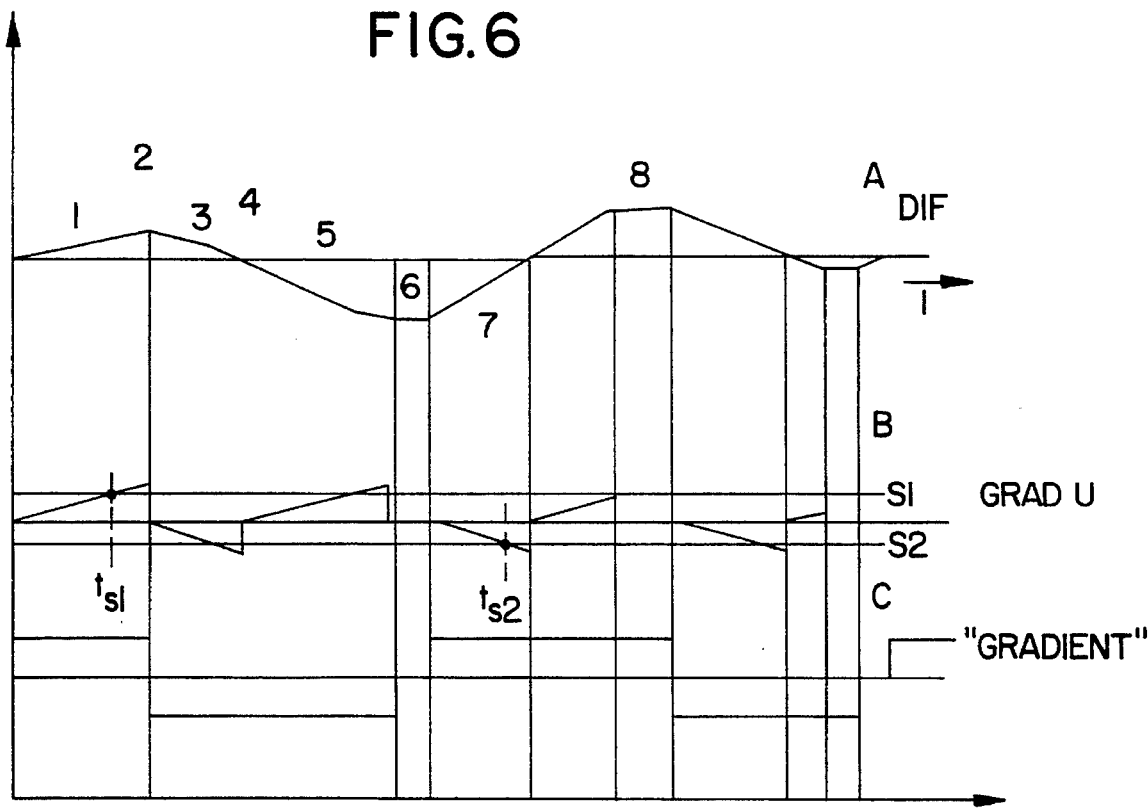

Because of the afore-described fixed counting rates and because of the filtering of the signals, it is possible that in case of particularly fast steering-in and steering-out operations, the control unit will not be quick enough to identify the actually prevailing conditions and, thus, not able to adapt control to this situation. An additional counter is provided in order to overcome this shortcoming. This counter identifies steering-in and steering-out operations by means of monitoring the gradient of the difference value DIF. FIG. 6 serves to explain this measure.

Characteristic curve (A) of FIG. 6 shows the variation of difference value DIF in the event of fast steering-in and steering-out operations. A gradient monitoring system, identified by Grad Ü, is illustrated by curve (B) in FIG. 6. Reaching threshold values S1 and S2 at times $t_{s1}$, $t_{s2}$ means "steering-in identification" or "steering-out identification", respectively.

An auxiliary register (gradient), whose contents is represented by characteristic curve (C) in FIG. 6, registers the gradient of difference reference value DIF. The signals developed by means of gradient monitoring system Grad Ü serve to improve control in such special situations. Such a steering-in/out identification system is expediently superimposed on the "normal" cornering identification system or critical transversal acceleration identification system as described above.

The individual sections (1) through (8) of FIG. 6 are illustrations of the following:

The upper diagram (A) represents the variation of difference value DIF in several situations. In the initial section (1), the constant gradient of difference value DIF indicates steering into a bend after having pursued a straight-line course. The arrival at a threshold value S1 is evaluated for identifying the steering-in operation.

The maximum of difference value DIF, identified by the reversal point (2), will be reached when the steering-in operation has been terminated or is interrupted.

Section (3) represents the steering out of the bend. Arrival at threshold S2 leads to identifying the steering-out operation.

In section (4), the steering-out operation has been terminated; in section (5), it is followed by steering into a bend pointing into another direction. Difference value DIF has a constant gradient.

In section (6), the steering condition remains unchanged. The steering-in operation has been terminated. In section (7), it is followed by steering out of the bend. At section (8), there is another steering-in operation, however, not with maximum gradient.

By means of the registers "Grad Ü," gradient signals are developed which correspond to the information obtained and which are made available to the control unit for evaluation.

We claim:

1. A method for evaluating signals representative of wheel rotational behavior to identify cornering of an automotive vehicle with anti-lock and/or traction slip control, said method comprising the steps of measuring rotating velocities of two wheels of one axle; continuously detecting a correction value which depends on a difference in the rotating velocities of the wheels; where with the correction value being taken into account, a velocity difference of the two wheels is detected, and where the velocity difference is evaluated for cornering identification, characterized in that a reference value is formed which is representative of a straight-line course; in that, in accordance with a predetermined time pattern or time grid, the reference value is continuously corrected in dependence on the velocity difference; in that, for cornering identification, the velocity difference or a difference value representative of the velocity difference is compared with a momentary value of the reference value; and the identification of cornering is used by the anti-lock and/or traction slip control to influence wheel rotational behavior.

2. A method as claimed in claim 1, characterized in that, at the beginning and after the start of the time pattern or time grid the reference value will be corrected in relatively short steps or periods which will be prolonged stepwise or continuously.

3. A method as claimed in claim 2, characterized in that the periods in accordance with which the reference value is corrected lie in the order of magnitude ranging between 10 and 50 seconds at the beginning and in the order of magnitude ranging between 40 seconds and 8 minutes in a final state.

4. A method as claimed in claim 3 characterized in that the reference value is corrected by means of predetermined, variable, percentage rates of change.

5. A method as claimed in claim 4, characterized in that the rate of change is varied in at least three subsequent steps and, at the beginning, ranges between 0.2% and 1%, thereupon lying between 0.1% and 0.5%, and for the rest lying between 0.05% and 0.2%, of a theoretically maximum reference value.

6. A method as claimed in claim 5 characterized in that a number of minimum times after expiration of correction of the reference value is possible will be increased if, within predetermined periods, the velocity differences are small or no correction of reference value took place.

7. A method as claimed in claim 5 characterized in that the percentage rates of change will be reduced if, within predetermined periods, the velocity differences are small or no correction of reference value took place.

8. A method as claimed in claim 4, characterized in that the rate of change is varied in at least three subsequent steps and, at the beginning, ranges between 0.3% and 0.4%, thereupon lying between 0.1% and 0.3%, and for the rest lying between 0.1% and 0.15% of a theoretically maximum reference value.

9. A method as claimed in claim 2 characterized in that the reference value is obtained by means of a counter which, starting from a mean, registers a deviation of the velocity differences or of the difference value from the reference value and, as soon as the deviation reaches a limit value and/or persists beyond a predetermined period, will increase or decrease the reference value by a predetermined percentage value in the direction of a reduction of the deviations.

10. A method as claimed in claim 9, characterized in that, as long as the deviation of the velocity difference value from the reference value has the same direction, the contents of the counter will be increased or decreased at a rate of a counting cycle and in that correction of the reference value will take place when an upper or lower terminal value of the counter is reached.

11. A method as claimed in claim 9, characterized in that a counting speed of the counter is variable and, starting from a relatively fast cycle at the beginning, is halved several times.

12. A method as claimed in claim 11 characterized in that one or several additional memories are used which register the change of respectively the velocity difference value or of the gradient of the velocity difference value and serve the fast identification of steering-in and steering-out operations, of quick steering changes.

13. A method as claimed in claim 2 characterized in that cornering identification is started by operating an ignition of an engine of the automotive vehicle.

14. A method as claimed in claim 2 characterized in that cornering identification will not be evaluated before a threshold value of vehicle velocity will have been exceeded.

15. A method as claimed in claim 14, characterized in that a velocity threshold value is selected which ranges between 20 and 40 km/hr.

16. A method as claimed in claim 2 characterized in that, in a vehicle with front wheel drive or rear wheel drive, rotational behavior of the non-driven wheels is evaluated.

17. A method as claimed in claim 2 characterized in that, in an all-wheel drive vehicle, rotational behavior of the wheels of one axle is evaluated which are less influenced by the drive.

18. A method as claimed in claim 2 characterized in that vehicle velocity or vehicle reference velocity is compared with the velocity of the wheels monitored for cornering identification and in that the evaluation of cornering identification will be interrupted as soon as the difference between the vehicle velocity and a slower wheel exceeds a predetermined limit value and in that status of cornering identification detected until this time is considered constant.

19. A method as claimed in claim 2 characterized in that, upon the onset of anti-lock control or traction slip control, the status of cornering identification detected until this time is considered constant.

20. A method for evaluating signals representative of wheel rotational behavior to identify cornering of an automotive vehicle having anti-lock and/or traction slip control comprising the steps of:

evaluating the signals representative of the rotational behavior of two wheels on one axle of the automotive vehicle;

developing from the evaluation of the signals representative of the wheel rotational behavior a velocity difference value representative of a difference in velocities of the two wheels of the automotive vehicle;

developing a velocity reference value representative of velocity along a straight-line course;

continuously correcting said reference value dependent on said velocity difference value in accordance with a predetermined time pattern or time grid;

comparing said velocity difference value with the corrected value of said velocity reference value existing at the moment of comparison, to detect a difference between said velocity difference value and the corrected value of said velocity reference value, existing at the moment of comparison, identifying cornering; and the identification of cornering is used by the anti-lock and/or traction slip control to influence wheel rotational behavior.

21. A method according to claim 20 wherein, after the start of said time pattern or time grid, said velocity reference value is corrected in relatively short steps or periods which are prolonged stepwise or continuously.

22. A method according to claim 21 wherein said periods which correct said velocity reference value are within a range of 10 seconds and 50 seconds at the start and within a range of 40 seconds and 8 minutes in a final state.

23. A method according claims 22 wherein said velocity reference value is corrected by predetermined, variable, percentage rates of change.

24. A method according to claim 23 wherein said rate of change is varied in at least three subsequent steps and, at the start, is within a first range of 0.2% and 1%, thereafter is within a second range of 0.1% and 0.5%, and thereafter is within a third range of 0.05% and 0.2% of a theoretically maximum velocity reference value.

25. A method according to claim 24 wherein a number of minimum times after expiration of correction of said velocity reference value can take place is increased if, within predetermined periods, said velocity difference value is small or no correction of said velocity reference value has taken place.

26. A method according to claim 24 wherein the percentage rates of change are reduced if, within predetermined periods, said velocity difference value is small or no correction of said velocity reference value has taken place.

27. A method according to claim 24 wherein said first range is between 0.3% and 0.4%, said second range is between 0.1% and 0.3%, and said third range is between 0.1% and 0.15% of said theoretically maximum velocity reference value.

28. A method according to claim 21 wherein said velocity reference value is obtained by a counter which, starting from a mean, registers the deviation of said velocity difference value from said velocity reference value and, as soon as said deviation reaches a limit value and persists beyond a predetermined period, will increase or decrease said velocity reference value by a predetermined percentage value in the direction of a reduction of the deviations.

29. A method according to claim 28 wherein as long as said deviation of said velocity difference value from said velocity reference value continues in the same sense, contents of said counter are increased or decreased at a rate of a counting cycle and the correction of said velocity reference value takes place when an upper or lower terminal value of said counter is reached.

30. A method according to claim 29 wherein a counting speed of said counter is variable and, starting from a relatively fast cycle, is halved several times.

31. A method according to claim 30 wherein changes in said velocity difference value are registered and provide fast identification of steering-in and steering-out operations and quick steering changes.

32. A method according to claim 21 wherein cornering identification is started by operating an ignition of an engine of the automotive vehicle.

33. A method according to claim 21 wherein cornering identification will not commence until a threshold value of vehicle velocity is exceeded.

34. A method according to claim 33 wherein said velocity threshold value is with a range of 20 km/hr and 40 km/hr.

35. A method according to claim 21 wherein the rotational behavior of non-driven wheels is evaluated.

36. A method according to claim 21 wherein, in an all-wheel drive vehicle, the rotational behavior of those wheels of one axle which are less influenced by the drive is evaluated.

37. A method according to claim 21 wherein a vehicle reference velocity is compared with the velocity of the monitored wheels for cornering identification and the evaluation of cornering identification is interrupted as soon as the difference between the vehicle reference velocity and a slowest wheel exceeds a predetermined limit value and the status of cornering identification detected until this time is considered constant.

38. A method according to claim 37 wherein, upon the onset of anti-lock control or traction slip control, the status of cornering identification detected until this time is considered constant.

* * * * *